Figure 1:
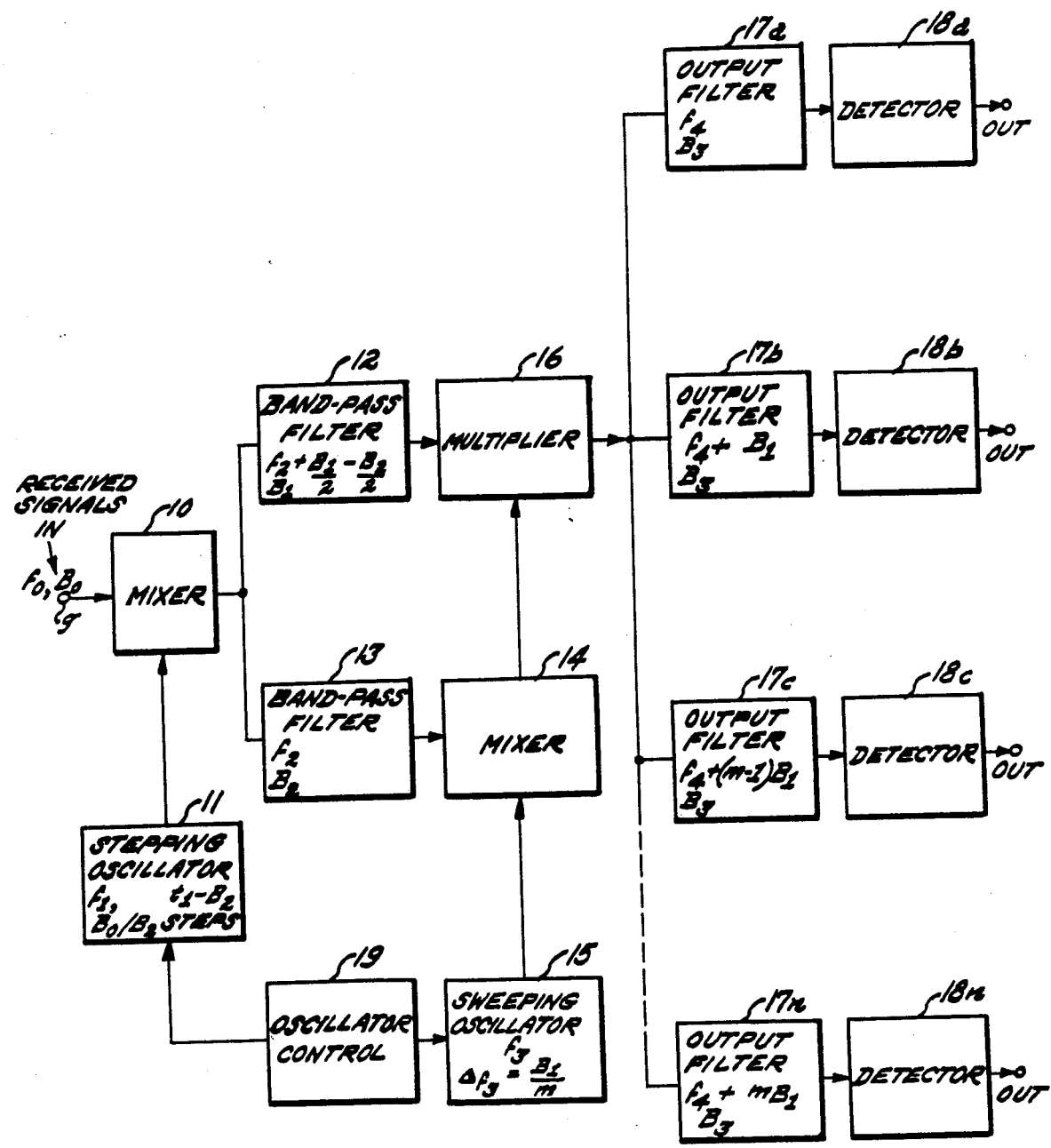

United States Patent [19]

Taylor et al.

[11] Patent Number: 4,962,534

[45] Date of Patent: Oct. 9, 1990

[54] FREQUENCY-DIVERSITY RECEIVER SYSTEM

[75] Inventors: Richard L. Taylor, Bladensburg; Ralph D. Drosd, deceased, late of Kensington; by Luther W. Gregory, administrator, Arnold, all of Md.

[73] Assignee: The United States of America as represented by the Secretary of the Air Force, Washington, D.C.

[21] Appl. No.: 607,607

[22] Filed: Jan. 4, 1967

[51] Int. Cl.$^5$ .......................... H04K 1/10; H03D 7/16
[52] U.S. Cl. .......................................... 380/34; 375/1; 455/314
[58] Field of Search ............... 325/332, 333, 334, 335, 325/416, 427, 430, 431, 432, 433, 458, 460; 324/79; 380/34; 455/314, 315; 375/1

[56] References Cited

U.S. PATENT DOCUMENTS 3,158,864 11/1964 Lehan ...................................... 375/1

Primary Examiner—Thomas H. Tarcza
Assistant Examiner—Gilberto Barron, Jr.
Attorney, Agent, or Firm—Jacob N. Erlich; Donald J. Singer

[57] ABSTRACT

A frequency diversity receiver system operating over a predetermined bandwidth comprising a first mixer receiving two identical information signals widely separated in frequency, a stepping oscillator with a predetermined number of steps controlling the output frequency of said mixer, two frequency channels at the output of said mixer, the first of said channels having a broad bandwidth filter and the second having a narrow bandwidth filter, a second mixer receiving simultaneously the output of said second filter and the output signal of a sweeping oscillator, said sweeping oscillator having a preselected sweep, means to synchronize said sweeping oscillator and said stepping oscillator, a multiplier simultaneously receiving the output signals from said first filter and said second mixer, a bank of parallel filters and associated detectors receiving the output signals from said multiplier, each of said filters of said bank having a predetermined bandwidth.

4 Claims, 2 Drawing Sheets

FREQUENCY-DIVERSITY RECEIVER SYSTEM

This invention relates to a panoramic receiver and more particularly a receiver system for detecting the present and frequency of frequency diversity transmissions of the type using two correlatable broadband noise-like signals widely separated in frequency.

The trend of military radio communications is toward the use of wideband, noise-like signals which are difficult to detect by means of conventional receivers. The signals not only have the appearance of noise, but, in some cases, the signal power may be many decibels below the noise power. The signal may be detected easily by a correlation process provided the characteristics of the signal are known.

This raises difficulties for military operations in the fields of reconnaissance, surveillance and jamming. Obviously, reconnaissance and surveillance of enemy transmissions ar impossible without reliable methods of detection and jamming these noise-like signals is impractical unless an intercept receiver is available to determine the frequency and characteristics of the signals to be jammed Up until now, the various detecting techniques that have been proposed are: narrow beam antennas; radiometric detectors; double sideband detectors; space diversity detectors; and time diversity detectors None of these techniques are suitable for detecting and analyzing frequency diversity transmissions.

Frequency-diversity transmissions make use of two identical signals which may be widely separated in frequency Efficient detection requires that the receiver pick up both signals and correlate them. Correlation makes it possible to use signals which may be buried in the noise by 10 db. The signal to noise ratio at the output of the correlator may be improved 20 db or more depending on the bandwidth of the signals and the information rate.

A receiver with two independently tuned RF stages could search out such a pair of signals However, the time required for search is excessive. For example, assume that the two frequencies: can be anywhere in a 100 mc band, the signal information rate is 5 kc and the receiver must dwell on the signals for a minimum of 200 microseconds. There are $4 \times 10^8$ possible frequency allocations and the time for one complete search of the 100 mc band is 11.5 hours. This is obviously impractical for most, if not all, military applications.

The present invention provides a system which can quickly search out a pair of correlatable signals in a wideband channel. The system has the following novel features: it reduces the required search time by correlating a wide spectrum of possible signals with a comparatively narrow spectrum It further reduces the search time by the use of multiple narrow-band filters at the output of the correlator which reduces the frequency sweep required.

An object of the present invention is to provide a frequency diversity receiver system of wideband noise-like signals.

Another object of the present invention is to provide a panoramic receiver system for detecting the presence and frequency of frequency diversity transmissions of the type using two correlatable broad band signals widely separated in frequency.

Various other objects, advantages, and features of novelty which characterize the invention are pointed out with particularity in the claims annexed hereto and forming a part hereof However, for a better understanding of the invention, its advantages, and objects attained by its use, reference should be had to the subjoining drawings, which form a further part hereof, and to the accompanying descriptive matter, in which there is illustrated and described a preferred embodiment of the invention.

Figure 2:
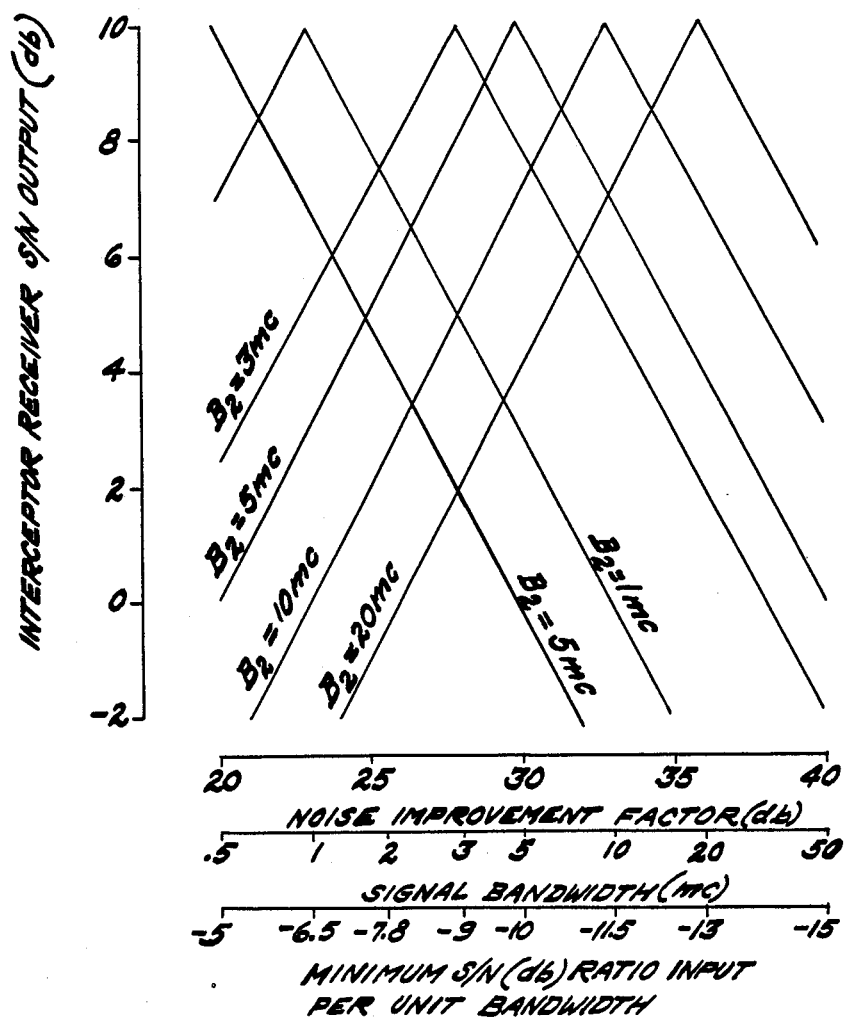

In the drawings:

FIG. 1 shows a receiver system block diagram of the preferred embodiment of the present invention; and FIG. 2 illustrates the overall sensitivity of the receiver system.

The system of the present invention is shown in FIG. 1 Terminal 9 is fed radio signals which may be obtained, for example by way of a data link receiver. The spectrum of possible received signal pairs is fed into mixer 10 whose output frequency is controlled by stepping oscillator 11. The output of mixer 10 is divided into two frequency channels by means of broad bandwidth, $B_1$, filter 12 and narrow bandwidth, $B_2$, filter 13. The center frequencies of these two filters are arranged so that the two bandwidths overlap—say on the low frequency side. Filter 12 is determined by the maximum expected frequency separation of the pair of signals. The bandwidth of filter 13 is determined by the maximum expected bandwidth of the signal. It is the output of these filters which are to be correlated.

The portion of the bandwidth, $B_O$, that is to be examined is determined by stepping oscillator 11 and the total bandwidth of filters 12 and 13. As stepping oscillator 11 changes frequency the portion of bandwidth, $B_O$, that is being correlated changes also. The number of steps required to cover $B_O$ is $$N = B_O/B_2$$

The output of narrow filter 13 is swept over a frequency range by means of mixer 14 and sweeping oscillator 15 and fed into multiplier 16 along with the output of broad filter 12 The output of multipler 16 contains all possible difference frequency between any signal that may pass through narrow filter 13 and its correlatable counterpart in filter 12. Obviously, the difference frequencies are swept in synchronism with sweeping oscillator 15. Sweeping oscillator 15 and stepping oscillator 11 are synchronized by utilizing oscillator control 19.

The output of multiplier 16 is fed to a bank of output filters 17a through 17n with bandwidths, $B_3$, of about 5 kc. The center frequencies of these output filters are equally spaced throughout the bandwidth. Since the output of multiplier 16 is being swept, any difference frequency present will coincide with the center frequency of one of the output filters at some time during the sweep The frequency sweep required of the sweeping oscillator is $$\Delta f = B_1/n$$

where n is the number of output filters.

The total time required for search is $$T = t/n \, B_O \, B_1 / \, B_2 \, B_3$$

where t is the time the difference frequency is within the bandwidth of one of the output filters. The search time for a possible set of parameters is shown below:

| | |
|---|---|
| $t = 2 \times 10^{-4}$ sec. | $B_1 = 100$ mc/s |
| $n = 100$ | $B_2 = 10$ mc/s |

| | | |
|---|---|---|
| $B_0$ = 100 mc/s | $B_3$ = | 5 kc/s |
| T = .4 sec. | | |

In the above exposition, it has been assumed that $B_2$ contains all of one of the two identical signals Obviously, if only part of this signal falls within $B_2$ the S/N output is reduced In the worst possible case only half of the signal falls within $B_2$. This reduces the S/N by 6 db This can be decreased by increasing the number of frequency steps Doubling the number of steps eliminates the loss completely at the expense of doubling the search time.

The system will give an output to any pair of correlatable signals. Any signal with a CW component will correlate with any other signal with a CW component AM broadcast signals fall in this category.

It should be noted that the output filter with the lowest center frequency will always indicate a signal at the beginning of the frequency sweep. This is due to the overlap of the filters 12 and 13. At the beginning of the sweep the outputs of these filters, even if they are simply random noise, will correlate to give a false indication When the frequency sweep changes by 5 kc (the bandwidth of the output filter) this false indication disappears and doesn't reappear until the end of the sweep when the next output filter will be activated These false indications can be eliminated by gating out the appropriate filters or by decreasing the frequency sweep by 5 kc. This does not cause loss of any signals of interest since the communications receiver has the same limitation and therefore will not use a signal pair with a frequency separation of less than 5 kc.

The overall sensitivity of the system is shown in FIG. 2 for selected values of $B_2$ and for various signals. It should be noted that the S/N input are the minimum that can be used by the data link receiver to give error free messages. In practice, it is expected that the signal will be several db greater in order to allow for normal variations in receiving conditions.

The difference frequency of the signal pair is determined by noting which of the output filters is activated and the instantaneous frequency of the sweeping oscillator. The absolute frequency can be determined from the frequency of the stepping oscillator.

What we claim is:

1. A frequency diversity receiver system operating over a predetermined bandwidth comprising a first mixer receiving two identical information signals widely separated in frequency, a stepping oscillator with a predetermined number of steps controlling the output frequency of said mixer, two frequency channels at the output of said mixer, the first of said channels having a broad bandwidth filter and the second having a narrow bandwidth filter, a second mixer receiving simultaneously the output of said second filter and the output signal of a sweeping oscillator, said sweeping oscillator having a preselected sweep, means to synchronize said sweeping oscillator and said stepping oscillator, a multiplier simultaneously receiving the output signals from said first filter and said second mixer, a bank of parallel filters and associated detectors receiving the output signals from said multiplier, each of said filters of said bank having a predetermined bandwidth.

2. A frequency diversity system as defined in claim 1 wherein the center frequencies of said first and second filter are arranged so that the two bandwidths overlap on the low frequency side, the bandwidth of said first filter being determined by the maximum expected frequency separation of said two identical signals, and the bandwidth of said second filter being determined by the maximum expected bandwidth of the signal.

3. A frequency diversity receiver as in claim 2 wherein the predetermined bandwidth of said frequency diversity receiver is determined by the number of steps in said stepping oscillator in combination with the total bandwidth of said first and second filter.

4. A frequency diversity receiver as defined in claim 1 wherein said second filter is swept over a predetermined frequency range by means of said second mixer and said sweeping oscillator to provide an output to said multiplier, said multiplier providing an output containing all possible frequencies between the signal passing through said first filter and said second filter with the difference frequencies being swept in synchronism with said sweeping oscillator.

* * * * *